United States Patent [19]

Fagerburg et al.

[11] Patent Number: 4,503,216
[45] Date of Patent: Mar. 5, 1985

[54] HYDROXYL-TERMINATED POLYETHER-ESTERS

[75] Inventors: David R. Fagerburg; Winston J. Jackson, Jr., both of Kingsport, Tenn.

[73] Assignee: Eastman Kodak Company, Rochester, N.Y.

[21] Appl. No.: 581,937

[22] Filed: Feb. 21, 1984

[51] Int. Cl.³ .............................................. C08G 63/10
[52] U.S. Cl. ........................................ 528/355; 528/76; 528/354; 528/358; 560/60; 560/116; 560/126; 560/185
[58] Field of Search ....................... 528/354, 355, 358; 560/60, 116, 126, 185

[56] References Cited

U.S. PATENT DOCUMENTS

| | | | |
|---|---|---|---|
| 2,962,524 | 11/1960 | Hostettler et al. | 528/366 X |
| 3,301,824 | 1/1967 | Hostettler et al. | 528/354 |
| 3,324,070 | 6/1967 | Hostettler et al. | 528/354 X |
| 3,379,693 | 4/1968 | Hostettler et al. | 528/354 X |
| 3,629,374 | 12/1971 | Lundberg et al. | 528/354 X |
| 3,795,701 | 3/1974 | Jenkins et al. | 528/354 X |
| 4,291,155 | 9/1981 | Brochet | 528/354 X |

*Primary Examiner*—Earl A. Nielsen
*Attorney, Agent, or Firm*—Clyde L. Tootle; David E. Cotey; J. Frederick Thomsen

[57] ABSTRACT

The present invention provides substantially difunctional hydroxyl-terminated polyether-esters and a process for preparing the same. The process comprises reacting ethylene carbonate with a substituted or unsubstituted epsilon-caprolactone in the presence of a catalytic amount of a specified catalyst at a temperature of at least about 200° C. The catalyst comprises an alkali metal salt, a quaternary ammonium salt, or a mixture thereof. The products of the invention are pourable liquid urethane-forming polyols at room temperature.

18 Claims, No Drawings

HYDROXYL-TERMINATED POLYETHER-ESTERS

DESCRIPTION

Background of the Invention

The present invention relates to hydroxyl-terminated polyether-esters. The polyether-esters are prepared from the reaction of substituted or unsubstituted epsilon-caprolactone and ethylene carbonate in the presence of a specified catalyst system comprising an alkali metal salt, a quaternary ammonium salt, or a mixture thereof. The copolymers are useful as urethane-forming polyols.

The use of caprolactone-based polymers as polyols in urethane manufacture is known in the art. However, prior art homopolymers and copolymers of epsilon-caprolactone are characterized and identified as polyester polyols and tend to crystallize upon standing. This characteristic of prior art polymers necessitates the heating of storage tanks in order to keep the product in a flowable form. These prior art products are therefore disadvantageous from a practical commercial standpoint. Such prior art polymers are disclosed, for example, in the *Kirk-Othmer Encyclopedia of Chemical Technology*, Third Edition, Vol. 23, page 585, where it is disclosed that polyester polyols can be made by the reaction of caprolactone with suitable glycols. The resulting product is essentially a homopolymer of caprolactone (i.e., polycaprolactone) having terminal hydroxyl groups provided by the glycol component.

The prior art also discloses hydroxyl-terminated polyester-carbonates prepared from lactones and cyclic carbonate compounds. In particular, U.S. Pat. No. 3,301,824 discloses the copolymerization of cyclic carbonates containing at least six atoms in the ring nucleus with at least one cyclic ester (i.e., a lactone; see Column 16, lines 7–12). The patent discloses the use of organometallic catalysts comprising Group II, Group III-B, or Group I-A metals covalently bonded to furyl radicals, pyridyl radicals, and/or hydrocarbon radicals. The resulting products contain a plurality of carbonate groups in the essentially linear polymeric chain thereof. Similar disclosures are found in U.S. Pat. Nos. 3,324,070 and 3,379,693, which describe the use of an initiator having reactive hydrogen in combination with an ester exchange catalyst; the resulting product again is a polycarbonate (U.S. Pat. No. 3,379,693, Col. 10, lines 32–45).

In contrast to these teachings of the prior art, the present invention provides hydroxyl-terminated polymers containing ester linkages and ether linkages. The products of the present invention provide pourable liquid polyols which can be used to advantage in polyurethane reaction systems.

SUMMARY OF THE INVENTION

In one aspect of the present invention, there is provided a process for preparing substantially difunctional hydroxyl-terminated polyether-esters. The process comprises reacting ethylene carbonate with a specified lactone in the presence of a catalytic amount of a catalyst comprising an alkali metal salt, a quaternary ammonium salt, or a mixture thereof at a temperature of at least about 200° C. The lactone component has the following formula

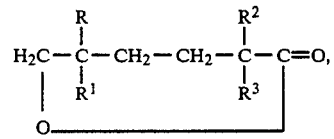

wherein R, $R^1$, $R^2$, and $R^3$ each independently represents H, alkyl, cycloalkyl, alkoxy, or single-ring aromatic radicals.

In another aspect of the present invention, there is provided a liquid, pourable, substantially difunctional, hydroxyl-terminated polyether-ester. The novel polymer consists essentially of the recurring units $$-CH_2-CH_2-O-$$

and

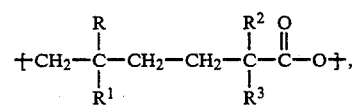

wherein each of R, $R^1$, $R^2$, and $R^3$ independently represents H, alkyl, cycloalkyl, alkoxy, or single-ring aromatic radicals. The polyether-ester has a number average molecular weight of about 1,000 to 2,000.

DETAILED DESCRIPTION OF THE INVENTION

The present invention relates to hydroxyl-terminated polyether-esters and to a process for preparing the same. In the process of the present invention, ethylene carbonate (1,3-dioxolan-2-one) is reacted with a specified lactone in the presence of a catalytic amount of a specified catalyst.

The lactones which are useful in the process of the present invention comprise unsubstituted and substituted epsilon-caprolactone (2-oxepanone) as represented by the following formula:

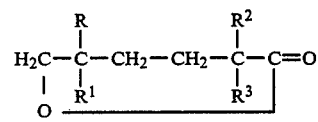

In the above formula, each of R, $R^1$, $R^2$, and $R^3$ independently represents H, alkyl, cycloalkyl, alkoxy or single-ring aromatic radicals. The alkyl, cycloalkyl, alkoxy, and single-ring aromatic radicals contain from 1 to about 12 carbon atoms. Suitable alkyl groups include methyl, ethyl, propyl, isopropyl, hexyl, octyl, and dodecyl radicals; suitable cycloalkyl radicals include cyclopentyl, cyclohexyl, etc.; suitable alkoxy radicals include methoxy, ethoxy, etc.; and suitable aromatic radicals include phenyl, benzyl, etc. This listing is not intended to be exhaustive but is indicative of the various types of radicals which can be found in a suitable substituted epsilon-caprolactone. Thus, among the substituted epsilon-caprolactones considered most suitable for purposes of this invention are monoalkyl epsilon-caprolactones such as monomethyl-, monoethyl-, monopropyl-, and monoisopropyl-epsilon-caprolactones; dialkyl epsilon-caprolactones in which the two alkyl groups are substituted on the same or different carbon atoms; trialkyl epsilon-caprolactones; alkoxy epsilon-caprolactones, such as methoxy- and ethoxy-epsilon-caprolactones; and cycloalkyl, aryl, and aralkyl epsilon-caprolactones, such as cyclohexyl-, phenyl-, and benzyl-epsilon-caprolactones. Preferably, however, the lactone component comprises unsubstituted epsilon-caprolactone.

The ethylene carbonate and caprolactone components are preferably provided to the reaction system in approximately stoichiometric quantities. However, small excesses of one or the other of the reactants does not significantly affect the results of the reaction.

The reaction of ethylene carbonate with the lactone component is conducted in the presence of a catalytic amount of a catalyst comprising an alkali metal salt, a quaternary ammonium salt, or a mixture thereof. Of the alkali metal salts, especially useful salts include the carboxylates having about 2 to 12 carbon atoms, the halides, and the hydroxides of one or more of the alkali metals. Thus, the alkali metal salts may comprise the acetates, propionates, butyrates, etc., chlorides, bromides, iodides, and hydroxides of lithium, sodium, potassium, rubidium, and cesium. Of the alkali metals, sodium and potassium are especially preferred. Thus, preferred alkali metal salts include sodium hydroxide, potassium hydroxide, sodium acetate, potassium acetate, sodium chloride, sodium bromide, sodium iodide, potassium chloride, potassium bromide, potassium iodide, and mixtures thereof.

The quaternary ammonium salts which are useful as catalysts in the process of the present invention have the general formula $(R^4)_4N^+X^-$. In the above formula, each $R^4$ group independently represents a linear or branched alkyl of 1 to about 18 carbon atoms, and $X^-$ represents halide, hydroxide, or a carboxylate anion having 2 to about 12 carbon atoms. The term "branched alkyl" includes aralkyl radicals, such as benzyl radicals. Thus, suitable $R^4$ radicals include methyl, ethyl, n-propyl, isopropyl, n-butyl, isobutyl, tertiary butyl, the isomeric hexyl radicals, the isomeric octyl radicals, dodecyl radicals, etc. Preferred quaternary ammonium salts include ethyltrimethylammonium hydroxide, tetraethylammonium hydroxide, benzyltriethylammonium hydroxide, propyltrimethylammonium hydroxide, butyltrimethylammonium hydroxide, tetraethylammonium bromide, tetrabutylammonium bromide, tetrabutylammonium hydroxide, tetraethylammonium acetate, and mixtures thereof.

The catalyst is employed in the process of the present invention in an amount of about 0.05 to 1.2 mole percent, based upon the number of moles of ethylene carbonate present in the reaction system. Surprisingly, the molecular weight of the final polymer appears to be relatively independent of the catalyst concentration. Therefore, relatively low concentrations of catalyst are preferred. However, the time required for the polymerization reaction may become unnecessarily lengthy at extremely low catalyst concentrations.

The process of the present invention is conducted at a temperature of at least about 200° C. It is preferable to avoid conducting the reaction above the boiling point of ethylene carbonate; therefore, at atmospheric pressure, the reaction temperature is preferably held to less than about 250° C. (e.g., about 220° to 240° C.). The reaction typically is conducted at atmospheric pressure. However, higher pressures may be satisfactory or even desirable under certain circumstances. During the course of the reaction, evolution of carbon dioxide occurs, and entrainment of the reactants in the evolved carbon dioxide can commonly be avoided at elevated pressures. Thus, pressures as high as about 10 atmospheres can be employed where desired.

The reaction is conducted for a period of time which is sufficient to allow the virtual cessation of evolution of carbon dioxide. Typically, reaction times of about 2 to 6 hours are sufficient. However, as noted above, the time of reaction is dependent upon the catalyst concentration.

In the process of the present invention, the reaction mixture may further comprise about 0.01 to 0.5 mole of a polyfunctional alcohol per mole of ethylene carbonate. The addition of a polyfunctional alcohol, such as a glycol, to the reaction mixture operates to produce a polymer of lower molecular weight than otherwise would be obtained. Suitable polyfunctional alcohols include ethylene glycol, propylene glycol, neopentyl glycol, pentaerythritol, etc. Preferably, the polyfunctional alcohol comprises ethylene glycol.

The reaction mixture can be anhydrous, but water can also be present in the reaction system. For example, water may be introduced in the form of hydrated catalysts, such as lithium acetate dihydrate. It may also be desirable to add water to the reaction system with the catalyst. However, the amount of water in the reaction system should not exceed about 5 moles of water for each mole of catalyst present in the reaction system.

The process of the present invention produces a liquid, pourable, substantially difunctional, hydroxyl-terminated polyether-ester. The polyether-esters consist essentially of the following recurring units:

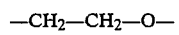

and

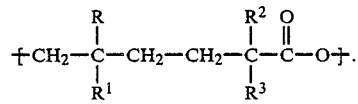

In the above formulas, each of R, $R^1$, $R^2$, and $R^3$ independently represents H, alkyl, cycloalkyl, alkoxy, or single-ring aromatic radicals, as described above. The polyether-esters typically exhibit a number average molecular weight of about 1,000 to 2,000. The molecular weight of the products can be established by determining the boiling point elevation of the product in methylene chloride.

The polyether-ester product can be further characterized on the basis of its acid number and hydroxyl number. These determinations are made by standard ASTM measurements (ASTM D-2849-69). The acid number of the polyether-ester product preferably is less than about 1.00 mg KOH/g and, more preferably, is less than about 0.5 mg KOH/g. Acid number values greater than these indicate a tendency of the polymer to yield a urethane product having an undesirably short pot life.

The hydroxyl number of the polyether-ester of the present invention is significant as a factor in the determination of the functionality of the polyether-ester product. The functionality of the product can be determined from the OH number by the following calculations:

$$\frac{5.6 \times 10^4 \text{ mg KOH/equivalent (eq.)}}{\text{OH No. (mg KOH/g of sample)}} = A \text{ (g of sample/eq.)}$$

$$\text{functionality } (F) = \frac{\text{molecular weight (g of sample/mole)}}{a \text{ (g of sample/eq.)}} =$$

$$F \text{ (eq./mole)}$$

The polyether-ester products of the present invention have been found to be substantially difunctional. Preferably, the polyether-ester products exhibit a functionality of about 1.8 to 2.5.

It has been observed that the polyether-ester products of the present invention are formed by an approximately equimolar reaction between the ethylene carbonate and unsubstituted or substituted epsilon-caprolactone. The polyether-ester product of the reaction appears to be predominantly an alternating type of copolymer. Spectroscopic evidence, such as obtained by infrared and NMR spectroscopy, indicates the presence of ether and ester linkages in the polymer chain and the absence of carbonate linkages from the polymer chain. These results comport with the observation of carbon dioxide evolution during the course of the reaction process. Thus, while not intending to be bound by theoretical considerations, it appears that during the course of the reaction, the lactone ring is opened so as to provide an ester linkage in the polymer product, and the ethylene carbonate ring is opened and carbon dioxide is evolved so as to provide an ether linkage (represented by the —$CH_2$—$CH_2$—O— group) in the polymer product. This product differs substantially from prior art products which incorporated only ester linkages in the polymer chain or which incorporated carbonate linkages within the polymer chain. Unlike polycaprolactone, the products of the present invention do not tend to crystallize upon standing. This characteristic of the products of the present invention is quite significant for obvious practical reasons.

This invention will be further illustrated by the following examples although it will be understood that these examples are included merely for purposes of illustration and are not intended to limit the scope of the invention.

EXAMPLE 1

This Example illustrates the reaction of ethylene carbonate and epsilon-caprolactone to produce a pourable liquid polyol.

Into a 300 ml, three-neck flask were placed 57.0 g (0.5 mole) of epsilon-caprolactone, 44.0 g (0.50 mole) of ethylene carbonate, and 0.049 g (0.5 millimole; 0.1 mole % based on ethylene carbonate) of potassium acetate.

The mixture was heated with stirring in a 240° C. metal bath for 150 minutes, after which time carbon dioxide evolution appeared to have ceased. The product was a liquid at room temperature. The hydroxyl number of the product was 77 mg KOH per g product, and the acid number was 0.74 mg KOH per g product. The number average molecular weight by boiling point elevation was determined to be 1554, and the functionality of the polyether-ester product was 2.1.

EXAMPLE 2

Example 1 was repeated except that 0.051 grams of lithium acetate dihydrate was employed as catalyst. The time of reaction was 235 minutes. The product was a liquid at room temperature and exhibited an acid number of 0.49 mg KOH per g product and a hydroxyl number of 75.0 mg KOH per g product. The number average molecular weight by boiling point elevation was determined to be 1344, and the functionality of the polyether-ester product was 1.8.

EXAMPLE 3

This Example illustrates the addition of a glycol to the reaction system.

Example 1 was repeated except that 39.6 g (0.45 mole) of ethylene carbonate was used and 3.1 g (0.05 mole) of ethylene glycol was added to the reaction mixture. Heating for 345 minutes in a 240° C. metal bath gave a product having a hydroxyl number of 104.8 mg KOH per g product and an acid number of 0.10 mg KOH per g product.

The invention has been described in detail with particular reference to preferred embodiments thereof, but it will be understood that variations and modifications can be effected within the spirit and scope of the invention.

We claim:

1. A process for preparing substantially difunctional hydroxyl-terminated polyether-esters which comprises reacting ethylene carbonate with a lactone having the formula

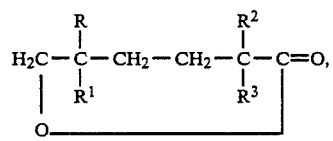

wherein R, $R^1$, $R^2$, and $R^3$ each independently represents H, alkyl, cycloalkyl, alkoxy, or single-ring aromatic radicals, in the presence of a catalytic amount of a catalyst comprising an alkali metal salt, a quaternary ammonium salt, or a mixture thereof, at a temperature of at least about 200° C.

2. The process of claim 1 wherein said lactone comprises epsilon-caprolactone.

3. The process of claim 1 wherein said catalyst comprises a salt of sodium or potassium.

4. The process of claim 1 wherein said alkali metal salt comprises a carboxylate having about 2 to 12 carbon atoms, a halide, or a hydroxide of one or more of the alkali metals.

5. The process of claim 1 wherein said alkali metal salt comprises sodium hydroxide, potassium hydroxide, sodium acetate, potassium acetate, sodium chloride, sodium bromide, sodium iodide, potassium chloride, potassium bromide, potassium iodide, or a mixture thereof.

6. The process of claim 1 wherein said quaternary ammonium salt has the general formula $(R^4)_4N^+X^-$, wherein each $R^4$ group independently represents a linear or branched alkyl of 1 to about 18 carbon atoms and wherein $X^-$ represents halide, hydroxide, or a carboxylate anion having 2 to about 12 carbon atoms.

7. The process of claim 6 wherein said quaternary ammonium salt comprises ethyltrimethylammonium hydroxide, tetraethylammonium hydroxide, benzyltriethylammonium hydroxide, propyltrimethylammonium hydroxide, butyltrimethylammonium hydroxide, tetraethylammonium bromide, tetrabutylammonium bromide, tetrabutylammonium hydroxide, tetraethylammonium acetate, or a mixture thereof.

8. The process of claim 1 wherein said catalyst is employed in an amount of about 0.05 to 1.2 mole percent.

9. The process of claim 1 wherein the temperature is about 220° to 240° C.

10. The process of claim 1 wherein the time of reaction is sufficient to allow the virtual cessation of evolution of carbon dioxide.

11. The process of claim 10 wherein the reaction is conducted for a period of time of about 2 to 6 hours.

12. The process of claim 1 wherein the reaction mixture further comprises about 0.01 to 0.5 mole of a polyfunctional alcohol per mole of ethylene carbonate.

13. The process of claim 12 wherein said polyfunctional alcohol comprises ethylene glycol.

14. A process for preparing substantially difunctional, hydroxyl-terminated polyether-esters which comprises reacting ethylene carbonate with epsilon-caprolactone in the presence of a catalyst comprising a carboxylate having about 2 to 12 carbon atoms, a halide, or a hydroxide of sodium or potassium; a quaternary ammonium salt having the general formula $(R^4)_4N^+X^-$, wherein each $R^4$ group independently represents a linear or branched alkyl of 1 to about 18 carbon atoms and wherein $X^-$ represents halide, hydroxide, or a carboxylate anion having 2 to about 12 carbon atoms; or a mixture thereof, said catalyst being present in an amount of about 0.05 to 1.2 mole percent, the reaction being conducted at a temperature of about 220° to 240° C. for a period of time sufficient to allow the virtual cessation of evolution of carbon dioxide.

15. The process of claim 14 wherein said catalyst comprises sodium hydroxide, potassium hydroxide, sodium acetate, potassium acetate, sodium chloride, sodium bromide, sodium iodide, potassium chloride, potassium bromide, potassium iodide, ethyltrimethylammonium hydroxide, tetraethylammonium hydroxide, benzyltriethylammonium hydroxide, propyltrimethylammonium hydroxide, butyltrimethylammonium hydroxide, tetraethylammonium bromide, tetrabutylammonium bromide, tetrabutylammonium hydroxide, tetraethylammonium acetate, or a mixture thereof.

16. The process of claim 14 wherein said reaction is conducted for a period of time of about 2 to 6 hours.

17. The process of claim 14 wherein the reaction mixture further comprises about 0.01 to 0.5 mole of a polyfunctional alcohol per mole of ethylene carbonate.

18. The process of claim 17 wherein said polyfunctional alcohol comprises ethylene glycol.

* * * * *